Patented Mar. 1, 1938

2,110,042

UNITED STATES PATENT OFFICE 2,110,042

RESINOUS COMPOSITION

Carroll B. Hall, Beaver Falls, and John D. McBurney, Newburgh, N. Y., and Edgar H. Nollau, Wilmington, Del., assignors to E. I. du Pont de Nemours & Company, Wilmington, Del., a corporation of Delaware No Drawing. Application April 28, 1936, Serial No. 76,846

2 Claims. (Cl. 260—8)

This invention relates to synthetic resins and more particularly to synthetic resins of the polyhydric alcohol-polybasic acid type.

It has been proposed heretofore to make quick drying resins by removing the slow drying components from glyceryl phthalate resins by means of a selected solvent. Such resins, however, dry too rapidly for many purposes and produce coatings which are brittle and unsatisfactory for many purposes. When these quick drying resins are applied to flexible or semi-rigid surfaces, the tendency of the resin toward brittleness causes the coating to crack when the surface is bent or folded. On the other hand, the slow drying portion extracted from the resin produces a film which is strong and tough and does not crack on bending when applied to a flexible or semi-rigid surface. However, because of its extreme slow drying properties its use is quite limited and impractical for most commercial purposes. Resins possessing satisfactory drying time balanced against satisfactory toughness are not readily prepared as such. Satisfactory compositions which possess both these properties are therefore highly desirable.

The invention has as an object the manufacture of quick drying resins which will produce flexible and highly lustrous coatings. A further object is the provision of a quick drying composition which can be applied to flexible or semi-rigid surfaces and which will not crack when such surfaces are bent or folded. Other objects will appear hereinafter.

These objects are accomplished by separating by means of selective solvent action the quick drying portion from the slow drying portion of polyhydric alcohol-polybasic acid resins and recombining the original resin with the quick drying portion, or combining the quick and slow drying portions, in pre-determined amounts to yield a resin composition having the required drying time and possessing improved properties of flexibility and toughness.

The resins which are subjected to the special treatment described herein are made by reacting with heat treatment a polyhydric alcohol, a polybasic acid and a fatty oil, or fatty oil acid. When the fatty oil is used it is usually preferable to first react the polyhydric alcohol and oil with heat treatment in the presence of a suitable catalyst, such as litharge.

Resins of the polyhydric alcohol-polybasic acid type which are particularly suited to the purposes of the present invention are identified below as Resins A, B, C.

Resin A

| | Pounds |
|---|---|
| Soya bean oil | 3,583.00 |
| Glycerol | 1,192.00 |
| Litharge | .90 |
| Phthalic anhydride | 2,752.00 |

This resin was prepared by heating the glycerol and soya bean oil with the litharge as a catalyst in a suitable vessel with constant stirring at a temperature of 200–225° C. for approximately 1½ hours. The phthalic anhydride was then added to the mixture and the heating continued at the temperature above noted for approximately six hours or for such a length of time as was necessary to produce an acid number in the resulting product of about 30.

Resin B

| | Pounds |
|---|---|
| Phthalic anhydride | 92.5 |
| China-wood oil acids | 62.00 |
| Glycerol | 45.5 |
| Hydrocarbon solvent | 93.60 |
| Ester solvent (mixture of butyl acetate and ethyl acetate) | 94.9 |

This resin was prepared by heating the phthalic anhydride, China-wood oil acids, glycerol and hydrocarbon solvent in a suitable vessel with constant stirring. The vessel was fitted with a condenser, a separator to hold the condensate and a return tube from the separator to the reaction vessel. On heating at the boiling point of the hydrocarbon solvent the water of reaction and the hydrocarbon are distilled and condensed, the condensate being collected in the separator. The condensate separates into two layers, the upper layer being a hydrocarbon which is returned to the reaction vessel and the lower aqueous layer is removed from the separator as necessary and discarded. The reaction is continued until the resin possesses the desired acid number and after cooling somewhat the ester solvent is added with necessary agitation.

Resin C

| | Pounds |
|---|---|
| Linseed oil | 2,184.00 |
| China-wood oil | 1,057.00 |
| Glycerol | 1,250.00 |
| Litharge | 3.25 |
| Phthalic anhydride | 3,015.00 |

This resin was prepared by heating the glycerol, linseed and China-wood oil with the litharge as catalyst in a suitable vessel with constant stirring at a temperature of 200–225° C.

for approximately 1½ hours. The phthalic anhydride is then added to the mixture and the heating continued at 200-225° C. for approximately six hours or for such time until the acid number of the resulting product is equal to or less than 40.

The above drying oil modified resins, whether made with the drying oil or oil acids, contain, in addition to the acid radicals of polybasic acid, substantial amount of the acid radicals of the mixed acids derived from drying oil.

In carrying out our invention we may combine the residual or quick drying portion of the resin with the untreated resin, or we may recombine the fast drying portion of a resin with the extracted or slow drying portion of the same resin in ratios other than those present in the original resin, these ratios depending upon the properties desired in the composition, particularly with respect to drying time and toughness of film. Also we may combine the fast drying portion of one resin with the slow drying portion of a different resin, the two constituents being combined in either instance in the proportion required to produce a resin of the desired properties.

In using the quick drying portion or residue after the selective extraction of the alkyd resin, to obtain the objects of the invention, the ratio in which the constituents are combined is determined by the drying time which is desired for the resulting composition as well as the degree of flexibility of the film formed from such a composition. The more of the residue that is used with the resin itself, the quicker drying will be the resulting composition. For certain purposes where a very rapid drying composition is desired whose film may be brittle, but this property not being objectionable, the residue may be used alone. The extracted portion, which is the slow drying constituent of the resin and produces a very tough film, may also be used as such if desired for particular purposes.

The following example illustrates the present process as applied to two different resins:

Example I

Resin A, after cooling to about 65° C. or lower, was agitated with normal butyl alcohol. The alcohol is essentially a non-solvent for the entire resin but it is a solvent for the slow drying portion and thus removes this portion from the resin leaving as a residue the quick drying portion. From this quick drying portion is removed any remaining normal butyl alcohol either by subjecting the residue to the action of heat or to the action of pressure. If desired, the extraction may be repeated several times, the residue being finally freed from the extracting solvent for the slow drying portion of the original resin by well known methods. Resin B, a resin containing 35% China-wood oil, was likewise treated to separate it into its fast and slow drying constituents. The slow drying extract of Resin A, which dries in 60 minutes, was then combined with the fast drying extract of Resin B which dries in 10 seconds. By mixing the slow drying extract of Resin A with an equal amount of the fast drying portion of the Resin B the drying time was reduced to 18 minutes. When the proportion of the quick drying extract of Resin B was changed from 50% of the combination just mentioned to produce a composition containing 80% of the fast drying portion of Resin B and 20% of the slow drying portion of Resin A the drying time was reduced to 45 seconds; when the proportions were changed to 93% of the fast drying portion of Resin B and 7% of the slow drying extract of Resin A the drying time was 20 seconds. The drying tests were made by spreading the material on glass plates and drying at 90° C. until dust free.

Example II

Resin C was separated into its fast and slow drying constituents by dissolving the resin in toluol and treating the solution of the resin with approximately twice its weight of mineral spirits (boiling range about 140-170° C.) with agitation. The mineral spirits is a substantially non-solvent for the resin but is an extractant for its slow drying constituent. A partition of the two organic liquids takes place and the mineral spirits containing the extracted or slow drying portion of the resin is removed. The remainder of the liquid containing the residue or quick drying portion may be retained in its dissolved condition or the solvent removed by well known methods. Resinous compositions of predetermined drying time were then obtained by re-combining the fast drying portion with different amounts of the extracted or slow drying portion. The composite resins obtained in this manner are improved markedly in the properties of drying time, flexibility and luster.

Various extractants including petroleum solvents and alcohols may be used for effecting the initial separation of the fast and slow drying portions of the resin.

In using the quick drying portion or residue the ratio in which the constituents are combined is determined by the drying time which is desired for the resulting composition as well as the degree of flexibility and toughness of the film formed from such a composition.

In using the combination of the resin constituents as disclosed herein it has been found advantageous to add a drier to the composition in solution form to the extent of 0.05% metallic cobalt and 0.05% metallic manganese based on the total drying oil content of the resin. The amount of drier may be varied within limits well known to the art or its use may be entirely omitted. Using the amounts mentioned above, the compositions have been found to dry most satisfactorily between a temperature of 125-175° F.

Compositions of the type described herein find a diversity of uses. They are particularly adapted to the glazing of smooth flexible surfaces such as paper, cellulose derivative coated textiles, cardboard, and the like. They also find use in producing high luster finishes on smooth rigid surfaces such as wood, metal and plaster. Compositions of this nature find further applications as adhesives of the thermoplastic type, and are peculiarly adapted for this purpose because the drying time of the varnish can be regulated to meet almost any requirement of drying time commonly encountered in production schedules. Such compositions also find use as anchoring means for holding metal flake powders, pigments, and flocks to various surfaces in the production of certain effects and finishes well known in the coated textile art. The compositions may be heat treated in the same manner as the original resin and may be used as a basis for plastic compositions which are subsequently hardened by heat treatment with or without pressure. The resins of the present invention are also useful as an ingredient of cellulose nitrate or other cellulose derivative lacquer. The present invention is particularly advantageous in providing a means for obtaining a finish properly balanced in the properties of flexibility, toughness and drying time which peculiarly adapts the finish for use on surfaces which are subject to folding or bending.

The principal advantage of the present invention is the provision of resins of the polyhydric alcohol-polybasic acid type which possess a pre-determined drying time and the necessary toughness of film resulting therefrom. Drying time curves are plotted from the data obtained by combining various proportions of the resin components in accordance with the foregoing examples and noting the drying time of the different compositions. From these drying time curves mixtures can be formulated with pre-determined drying time and with selected flexibility and toughness characteristics. Our process provides a flexible system for controlling the mentioned properties to an extended degree thus allowing flexibility in producing surfaces with particularly desirable properties. The economic advantages of such a system are readily apparent.

As many apparently widely different embodiments of this invention may be made without departing from the spirit and scope thereof, it is to be understood that we do not limit ourselves to the specific embodiments thereof except as defined in the appended claims.

We claim:

1. A process for making resinous compositions which comprises treating polyhydric alcohol-polybasic acid resin, which contains in substantial amount the acid radicals of drying oil acids, with a solvent which selectively extracts the slow drying portion from the insoluble fast drying portion which remains as a residue, both said fast and slow drying portions being resinous reaction products which upon drying form films, and combining the fast drying portion with said slow drying portion, said fast drying portion being combined with said slow drying portion so that said resinous composition contains said fast and slow drying portions in amounts substantially different from those contained in untreated polyhydric alcohol-polybasic acid resins and in such proportion to produce films of pre-determined drying time which have greater toughness and flexibility than said last mentioned resin.

2. A resinous composition having a pre-determined drying time comprising a mixture of the fast and slow drying portions of polyhydric alcohol-polybasic acid resin obtained by treating said resin with a solvent which separates the resin into said fast and slow drying portions, said polyhydric alcohol-polybasic acid resin containing in substantial amount the acid radicals of drying oil acids, both said fast and slow drying portions being film-forming resinous reaction products, said fast drying portion being combined with said slow drying portion so that said resinous composition contains said fast and slow drying portions in amounts substantially different from those contained in untreated polyhydric alcohol-polybasic acid resins and in such proportions to produce films of pre-determined drying time which have greater toughness and flexibility than said last mentioned resin.

CARROLL B. HALL.
JOHN D. McBURNEY.
EDGAR H. NOLLAU.